(12) United States Patent
Li et al.

(10) Patent No.: US 11,107,482 B2
(45) Date of Patent: *Aug. 31, 2021

(54) SYSTEMS AND METHODS FOR SPEECH SIGNAL PROCESSING TO TRANSCRIBE SPEECH

(71) Applicant: RingCentral, Inc., Belmont, CA (US)

(72) Inventors: Xiaoming Li, Cupertino, CA (US); Ehtesham Khan, San Ramon, CA (US); Santosh Panattu Sethumadhavan, San Jose, CA (US)

(73) Assignee: RingCentral, Inc., Belmont, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/704,561

(22) Filed: Dec. 5, 2019

(65) Prior Publication Data

US 2020/0111499 A1 Apr. 9, 2020

Related U.S. Application Data

(63) Continuation of application No. 15/908,761, filed on Feb. 28, 2018, now Pat. No. 10,540,981.

(51) Int. Cl.
*G10L 19/005* (2013.01)
*G06N 7/08* (2006.01)
(Continued)

(52) U.S. Cl.
CPC ........ *G10L 19/005* (2013.01); *G06F 16/2379* (2019.01); *G06F 16/61* (2019.01);
(Continued)

(58) Field of Classification Search
CPC ..... G10L 19/005; G10L 25/30; G10L 15/142; G10L 15/14; G10L 15/26; G10L 15/08;
(Continued)

(56) References Cited

U.S. PATENT DOCUMENTS 8,731,908 B2    5/2014  Kapilow
9,583,111 B2 *  2/2017  Schechner ............. G10L 15/02
(Continued)

OTHER PUBLICATIONS

E. Moulines & F. Charpentier, "Pitch-Synchronous Waveform Processing Techniques for Text-to-Speech Synthesis Using Diphones," *Speech Communication*, vol. 9, pp. 453-467 (1990).

*Primary Examiner* — Huyen X Vo
(74) *Attorney, Agent, or Firm* — Finnegan, Henderson, Farabow, Garrett & Dunner, LLP (57) ABSTRACT

The present disclosure relates to systems and methods for speech signal processing on a signal to transcribe speech. In one implementation, the system may include a memory storing instructions and a processor configured to execute the instructions. The instructions may include instructions to receive the signal, determine if at least a portion of data in the signal is missing, and when at least a portion of data is missing: process the signal using a hidden Markov model to generate an output; using the output, calculate a set of possible contents to fill a gap due to the missing data portion, with each possible content having an associated probability; based on the associated probabilities, select one of the set of possible contents; and using the selected possible content, update the signal.

20 Claims, 8 Drawing Sheets

(51) Int. Cl.
    *G06N 3/04*          (2006.01)
    *G10L 25/30*        (2013.01)
    *G10L 15/14*        (2006.01)
    *G06N 3/08*          (2006.01)
    *G06F 16/61*        (2019.01)
    *G06F 16/23*        (2019.01)

(52) U.S. Cl.
    CPC .............. *G06N 3/0472* (2013.01); *G06N 3/08* (2013.01); *G06N 7/08* (2013.01); *G10L 15/142* (2013.01); *G10L 25/30* (2013.01); *G06N 3/0454* (2013.01)

(58) Field of Classification Search
    CPC ...... G06F 16/61; G06F 16/2379; G06F 16/23; G06N 7/08; G06N 3/04; G06N 3/08; G06N 3/0454; G06N 7/005; G06N 7/00; G06N 3/0472
    See application file for complete search history.

(56) References Cited

U.S. PATENT DOCUMENTS

| | | | |
|---|---|---|---|
| 10,409,789 B2* | 9/2019 | Zoll | ............ G06N 20/20 |
| 2002/0178004 A1 | 11/2002 | Chang et al. | |
| 2014/0330564 A1 | 11/2014 | Cox et al. | |
| 2015/0095026 A1* | 4/2015 | Bisani | .................. H04R 3/005 |
| | | | 704/232 |
| 2016/0275964 A1 | 9/2016 | Kim et al. | |
| 2016/0359943 A1 | 12/2016 | Huang et al. | |
| 2018/0268262 A1* | 9/2018 | Osada | ............... G06K 9/00335 |
| 2018/0376105 A1* | 12/2018 | Davies | ............... G06F 3/04842 |

* cited by examiner

SYSTEMS AND METHODS FOR SPEECH SIGNAL PROCESSING TO TRANSCRIBE SPEECH

CROSS-REFERENCE TO RELATED APPLICATIONS

This application is a continuation of U.S. application Ser. No. 15/908,761, filed Feb. 28, 2018. The contents of the above are incorporated herein by reference.

TECHNICAL FIELD

The present disclosure relates generally to the field of speech signal processing. More specifically, and without limitation, this disclosure relates to systems and methods for error correction in transcribing speech based on a signal.

BACKGROUND

Extant communications systems often rely on computer networks. The computer networks most commonly used, such as local area networks (LANs), the Internet, and the like are based on packet switching. Packet switching prioritizes packet timing at the expense of packet losses. Moreover, many network backbones provide higher downlink speeds than uplink speeds.

Accordingly, extant communications sessions, whether video, audio, or a combination thereof, often incur signal loss when data is sent from one participant, through one or more servers managing the communication session, to other participants. This signal loss results in degraded sound quality and/or loss of portions of audio upon receipt.

Extant recovery systems are generally implemented at the recipient's device. However, such devices lack sufficient resources to correct for missing packets at acceptable rates of accuracy (e.g., 90%, 95%, etc.). Moreover, recovery systems must be installed at each recipient's device to achieve error correction for all participants in a communications session.

SUMMARY

In view of the foregoing, embodiments of the present disclosure provide systems and methods for speech signal processing on a signal to transcribe speech. Accordingly, embodiments of the present disclosure may implement speech transcription, which generally has a high (e.g., greater than 90%, greater than 95%, or even nearing 100%) rate of accuracy, to recover lost data in received waveforms. Moreover, in accordance with some embodiments, the speech signal processing may be implemented on one or more servers managing a communications session rather than a recipient's device.

According to an example embodiment of the present disclosure, a system for speech signal processing on a signal to transcribe speech may comprise a memory storing instructions and a processor configured to execute the instructions. The instructions may comprise instructions to receive the signal, determine if at least a portion of data in the signal is missing, and when at least a portion of data is missing: process the signal using a hidden Markov model to generate an output; using the output, calculate a set of possible contents to fill a gap due to the missing data portion, with each possible content having an associated probability; based on the associated probabilities, select one of the set of possible contents; and using the selected possible content, update the signal.

According to another example embodiment of the present disclosure, a computer-implemented method for speech signal processing on a signal to transcribe speech may comprise receiving the signal, determining if at least a portion of data in the signal is missing, and when at least a portion of data is missing: processing the signal using a hidden Markov model to generate an output; using the output, calculating a set of possible contents to fill a gap due to the missing data portion, with each possible content having an associated probability; based on the associated probabilities, selecting one of the set of possible contents; and using the selected possible content, updating the signal.

According to yet another example embodiment of the present disclosure, a non-transitory computer-readable medium stores instructions for speech signal processing on a signal to transcribe speech. The instructions may comprise instructions to receive the signal, determine if at least a portion of data in the signal is missing, and when at least a portion of data is missing: process the signal using a hidden Markov model to generate an output; using the output, calculate a set of possible contents to fill a gap due to the missing data portion, with each possible content having an associated probability; based on the associated probabilities, select one of the set of possible contents; and using the selected possible content, update the signal.

It is to be understood that the foregoing general description and the following detailed description are example and explanatory only, and are not restrictive of the disclosed embodiments.

By performing speech signal processing on a signal to transcribe speech, embodiments of the present disclosure allow for interpolation of lost data in a waveform due to packet loss. Accordingly, embodiments of the present disclosure provide improvements over conventional error corrections. In addition, embodiments of the present disclosure may be implemented on one or more servers managing a communications session. Accordingly, embodiments of the present disclosure provide a more accurate and universal system for correcting waveforms than conventional systems.

BRIEF DESCRIPTION OF THE DRAWINGS

The accompanying drawings, which comprise a part of this specification, illustrate several embodiments and, together with the description, serve to explain the principles disclosed herein. In the drawings.

DETAILED DESCRIPTION

The disclosed embodiments relate to systems and methods for speech signal processing on a signal to transcribe speech. Embodiments of the present disclosure may be implemented using a general-purpose computer. Alternatively, a special-purpose computer may be built according to embodiments of the present disclosure using suitable logic elements.

According to an aspect of the present disclosure, a communications session may have a plurality of participants. In some embodiments, the conference session may be at least one of a video conference session and an audio conference session.

Each of the plurality of participants may use one or more user interface devices to connect to the communications session. For example, a user interface device may comprise a laptop computer, a desktop computer, a smartphone, a tablet, or any other device capable of receiving audio and/or video and transmitting it (e.g., over one or more computer networks, such as a local area network (LAN), a 4G network, a Long-Term Evolution (LTE) network, an Ethernet network, or the like). As used herein, the term "communications server" refers to one or more servers (which may reside on one or more server farms) to a communications server (e.g., communications server 801 of FIG. 8) executing one or more applications to facilitate a communications session.

In certain aspects, a plurality of participants may share one or more user interface devices. For example, a plurality of participants may connect to the communications session using a single computer within a conference room. Alternatively, a participant may use a user interface device without sharing. For example, a participant may use a tablet or a smartphone for connecting to the communications session.

In some embodiments, a processor of the communications server may receive a signal. The signal may comprise a waveform (or a digital representation thereof). For example, the signal may comprise an audio signal encoded in one or more formats (e.g., Waveform Audio Format (WAV), Advanced Audio Coding (AAC), MPEG-2 Audio Layer III (MP3), or the like). In certain aspects, the signal may comprise a speech signal (i.e., may include speech in the audio).

The signal may be received over one or more computer networks, as explained above. In some embodiments, the signal may have been encoded at one or more user interface devices prior to transmission over the one or more networks. For example, the one or more user interface devices may include one or more microphones and/or other audio recording devices that encode audio into a digital audio signal.

During transmission across one or more networks, the one or more user interface devices (or other device transmitting the signal) may divide the signal into one or more packets in accordance with standards for the one or more networks (e.g., Transmission Control Protocol/Internet Protocol (TCP/IP), User Datagram Protocol (UDP), Token Ring, or the like).

The processor may determine if at least a portion of data in the (received) signal is missing. For example, at least a portion may be missing due to packet loss during transmission. Other losses may occur, for example, during encoding of the signal (e.g., at the one or more user interface devices) and/or decoding of the signal (e.g., at the communications server). The processor may determine that at least a portion is missing by detecting a lost packet during packet reassembly and/or by detecting a portion of the signal that has null or other filler values (e.g., a series of zeroes or the like).

When at least a portion of data is missing, the processor may process the signal using a hidden Markov model to generate an output. For example, the processor may determine a set of transition probabilities to use for the states. The probabilities may be predetermined or may by dynamically determined based on one or more training sets. The states may be words, phonemes, diphones, triphones, senones, or the like. The output may comprise a transcription of the signal. For example, the output may be encoded as text (e.g., using American Standard Code for Information Interchange (ASCII), Unicode, or the like).

Using the output, the processor determines a set of possible contents to fill a gap due to the missing data portion. For example, the set of contents may comprise a set of possible text contents to fill a gap in the transcription. In some embodiments, each possible content may have an associated probability. For example, with respect to one gap, the set of possible contents may comprise a first content with an associated probability of one-fourth (25%), a second content with an associated probability of one-fifth (20%), and a third content with an associated probability of eleven-twentieths (55%). Although the probabilities in this example are percentages (and thus sum to 100%), the probabilities may have a total that exceeds or does not reach 100%, depending on rounding errors, the exclusion of one or more possible contents with associated probabilities below a threshold (e.g., 5% or less, 1% or less, or the like), or a combination thereof.

In some embodiments, the processor may determine the possible contents using a database that indexes waveforms to at least a portion of the output. For example, the database may include waveforms (or portions thereof) indexed by a corresponding transcription of the waveform (or the portion). The database may have been constructed from one or more training sets. For example, the processor may have used one or more training sets to transcribe one or more of the indexed waveforms and/or to estimate the indexed waveforms from a corresponding transcription.

Based on the associated probabilities, the processor may select one of the set of possible contents. For example, the processor may select the possible content having an associated probability that is a maximum. Additionally or alternatively, the processor may proceed using Condorcet criteria or using a Borda count. In embodiments where two or more possible contents have associated probabilities that are equal or close (e.g., within 1%, within 2%, within 5%, or the like), the processor may use one or more tie-breaking techniques. For example, the processor may compare a portion at the beginning and a portion at the end of the possible contents to a portion of the signal before the gap and a portion of the signal after the gap, respectively. Accordingly, the processor may perform the selection, at least in part, based on one or more similarity scores for the compared portions.

Using the selected possible content, the processor may update (or otherwise recover or reconstruct) the signal. For example, the processor may attach a portion of a waveform associated with the selected content. The processor may determine which waveform portion is associated with the selected content based on the database. The processor may then modify the received signal by replacing the gap with the associated waveform (or portion thereof). In some embodiments, the processor may further modify the received signal by smoothing the transition between the received signal and the attached waveform at the beginning of the portion that was previously the gap and the corresponding end.

In embodiments where the processor uses a database, the processor may update the database based on the updated signal. For example, after smoothing the waveform (or portion thereof) that was inserted into the signal and/or performing any additional modifications, the processor may update the associated waveform in the database and/or create a new entry in the database with the updated waveform. In some embodiments, the processor may smooth or otherwise adjust the waveform (or portion thereof) to replace the gap in the received signal, determine if the adjustments result in any changes to a corresponding transcription of the selected waveform, and update the database if there are any changes to the corresponding transcription.

In some embodiments, updating the database may include reducing a loss function associated with the database. For example, the processor may calculate a first loss function for the un-updated database and a second loss function for the database if the associated waveform is added thereto. The processor may then update the database if the second loss function is reduced compared to the first loss function.

Updating the database may be based on feedback received from one or more users. For example, the processor may send a signal to one or more user interfaces devices asking for feedback on whether the updated signal is good or bad. The user may be asked to rate the overall quality of the updated signal, to rate the naturalness of the updated signal, or the like. Additionally or alternatively, the user may be asked whether or not the updated signal was good, noticeable, or the like.

In some embodiments, the processor may use a hybrid hidden Markov model coupled with one or more neural networks. For example, the one or more neural networks may have been trained using one or more training sets (e.g., similar to the database, as explained above). Additionally or alternatively, the one or more neural networks may have been trained without training data, e.g., by using one or more clustering techniques (such as k-means clustering), one or more techniques for unsupervised learning of neural networks (such as autoencoding), and/or one or more latent variable models (such as an expectation-maximization algorithm, a method of moments, or the like).

In such embodiments, the processor may use probabilities output by the one or more neural networks to calculate the set of possible contents using the hidden Markov model. Accordingly, the processor may use the neural networks in combination with a lookup database, as explained above, or in lieu of the lookup database. In a combinatory example, the processor may select the possible contents from the lookup database and use the neural networks to determine the associated probabilities. In a non-combinatory example, the processor may run the hidden Markov model directly on the signal having the gap with the transition probabilities determined by the neural networks operating on the signal having the gap such that the set of possible contents is output directly from the hidden Markov model having associated probabilities from the neural networks.

In any of the embodiments above, the processor may send the updated signal to one or more participants in a communications session. For example, the processor may send the signal using a network interface controller (NIC). The NIC may communicate over at least one computer network, such as the Internet, a local area network (LAN), or the like. As explained above, the communications session may comprise at least one of a video conference and an audio conference. For example, a user interface device associated with at least one participant in the communications session may receive the signal from the processor over a computer network.

At the one or more user interface devices, the signal may be decoded after reception over one or more computer networks. For example, the one or more user interface devices may include one or more speakers and/or other transducers that convert a digital audio signal to corresponding sounds.

Although part or all of the steps above may be executed by a device associated with the recipient (e.g., a laptop computer, a desktop computer, a smartphone, a tablet, or the like). For example, the associated device may receive the signal, determine if at least a portion of data in the signal is missing, and when at least a portion of data is missing: process the signal using a hidden Markov model to generate an output; using the output, calculate a set of possible contents to fill a gap due to the missing data portion, with each possible content having an associated probability; based on the associated probabilities, select one of the set of possible contents; and using the selected possible content, update the signal.

Figure 1:
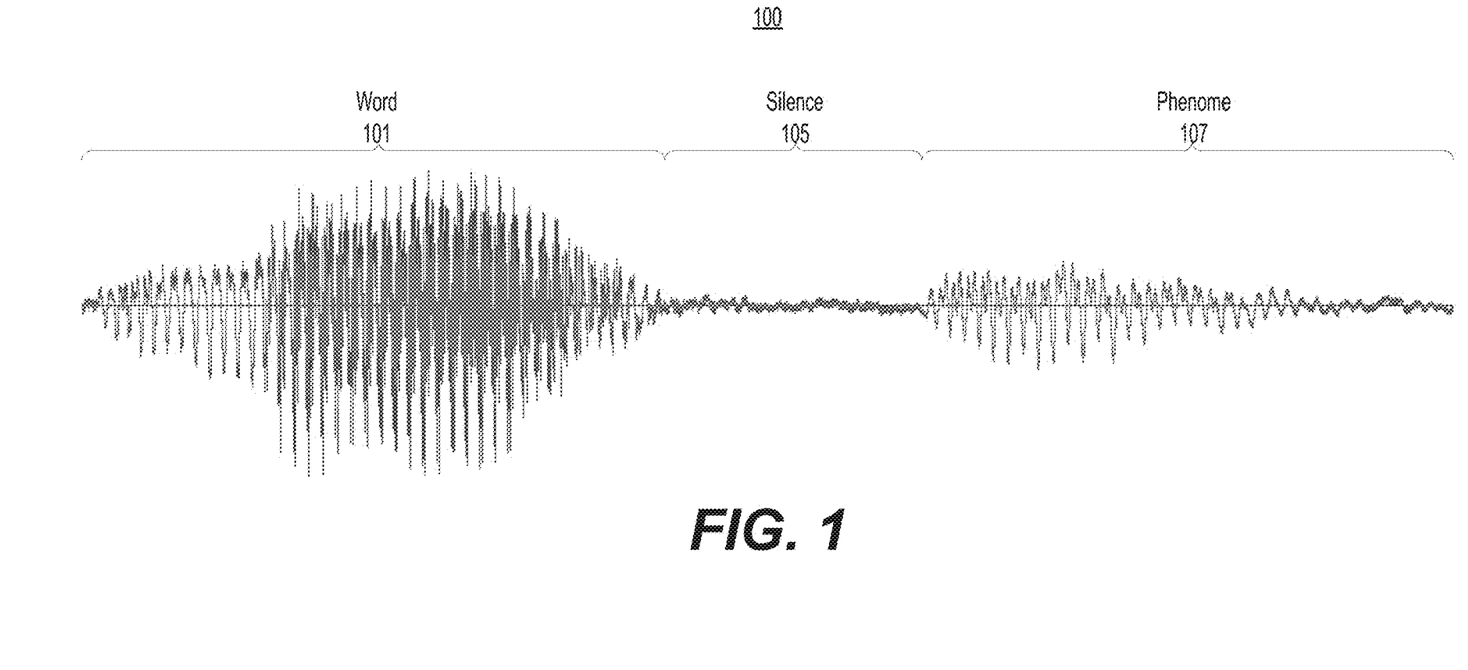
FIG. 1 is a representation of an example speech waveform, according to an example embodiment of the present disclosure.

Turning now to FIG. 1, there is shown a speech waveform 100. As depicted in FIG. 1, waveform 100 may include at least one word, e.g., word 101 ("Martin" in the example of FIG. 1). In the example of FIG. 1, waveform 100 may further include a silence 105 and one or more additional phenomes, e.g., phenome 107). Although depicted as a wave in FIG. 1, waveform 100 may be converted into an analog or a digital representation thereof, e.g., for transmission over one or more computer networks.

Figure 2:
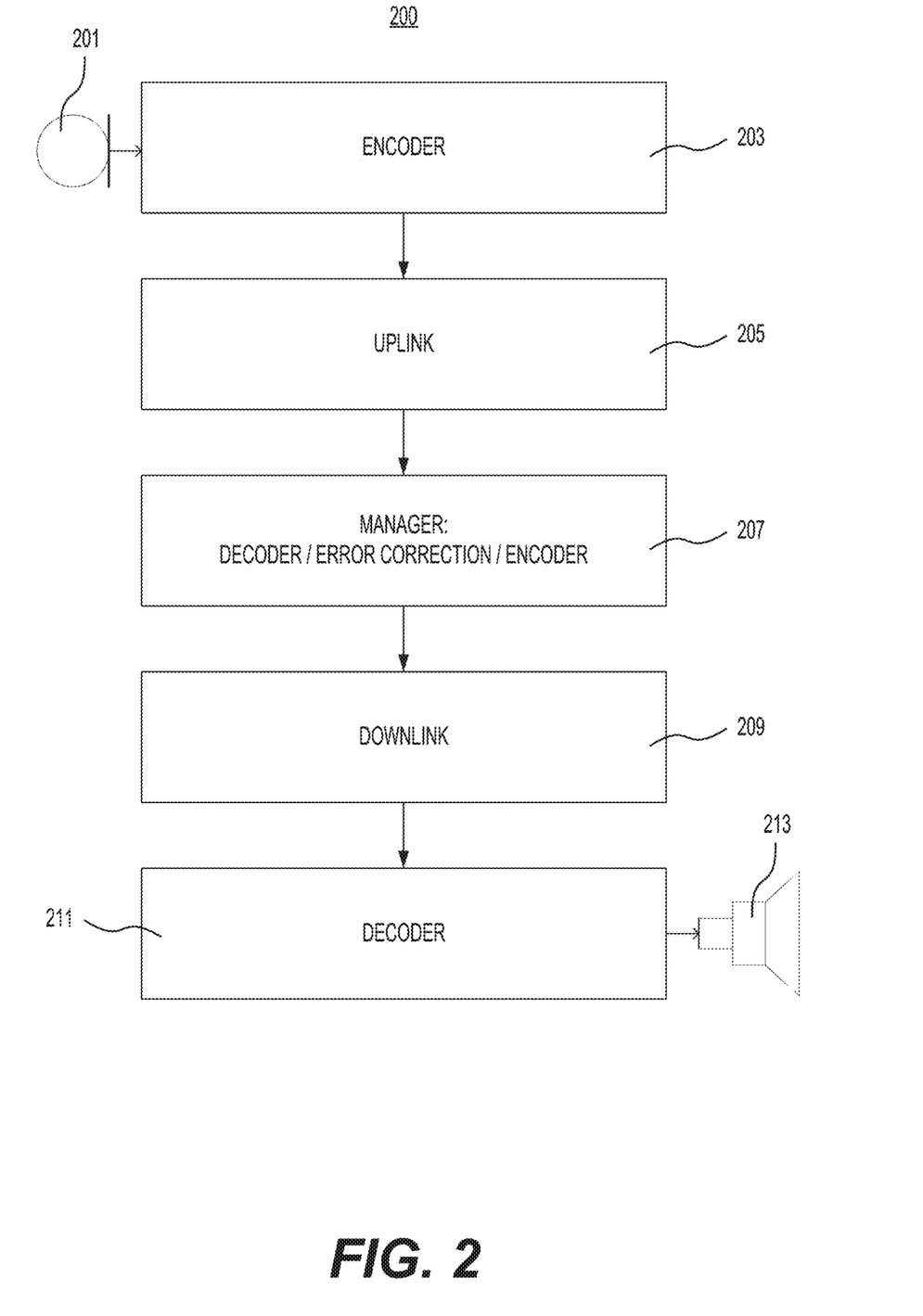
FIG. 2 is a diagram of an example system for transmission of a speech signal from one device to another over at least one computer network, according to an example embodiment of the present disclosure.

FIG. 2 depicts an example system 200 for transmission of a speech signal from one device to another over at least one computer network. As depicted in FIG. 2, the speech signal may be received from a client device (such as a user interface device, described above). Although depicted as using a microphone 201, any other transducer that converts sound into a digital, analog, or other electronic signal may be used.

System 200 may further include an encoder 203 for transmitting the audio signal over a computer network. For example, encoder 203 may comprise an analog-to-digital encoder to convert an analog audio signal from microphone 201 to a digital audio signal for transmission over a network. In some embodiments, encoder 203 may comprise a plurality of encoders. For example, encoder 203 may additionally or alternatively include a multiplexer, a codec, or the like.

As further depicted in FIG. 2, system 200 may include an uplink 205 for transmitting the encoded audio signal over one or more computer networks. For example, uplink 205 may include a NIC. The NIC may divide the signal into one or more packets in accordance with standards for the one or more networks (e.g., TCP/IP, UDP, Token Ring, or the like).

System 200 may further include a manager 207. As depicted in FIG. 2, manager 207 may decode the audio signal received over the computer network(s) in order to perform error correction followed by re-encoding. For example, manager 207 may decode the audio signal using a hidden Markov model (optionally with one or more neural networks) in order to fill one or more gaps in the audio signal, e.g., according to method 700 of FIG. 7, described below. Manager 207 may then encode the corrected signal for re-transmission over the same network and/or a different network.

As further depicted in FIG. 2, system 200 may include a downlink 209 for transmitting the encoded audio signal over one or more computer networks. For example, downlink 209 may include a NIC. The NIC may divide the corrected signal into one or more packets in accordance with standards for the one or more networks (e.g., TCP/IP, UDP, Token Ring, or the like).

System 200 may further include a decoder 211. For example, decoder 211 may comprise a digital-to-analog decoder to convert a digital audio signal received over one or more networks and send an analog signal to speaker 213. In some embodiments, decoder 211 may comprise a plurality of decoders. For example, decoder 211 may additionally or alternatively include a codec or the like. Although depicted as using a speaker 213, any other transducer that converts an electronic signal into one or more sounds may be used.

Microphone 201, encoder 203, and uplink 205 may all be located on a user interface device while manager 207 may be located on a remote server (e.g., one or more servers managing a communications session). Similarly, downlink 209, decoder 211, and speaker 213 may all be located on another user interface device. Accordingly, the user interface devices may be associated with participants on the same communications session being managed by the remote server.

Figure 3:
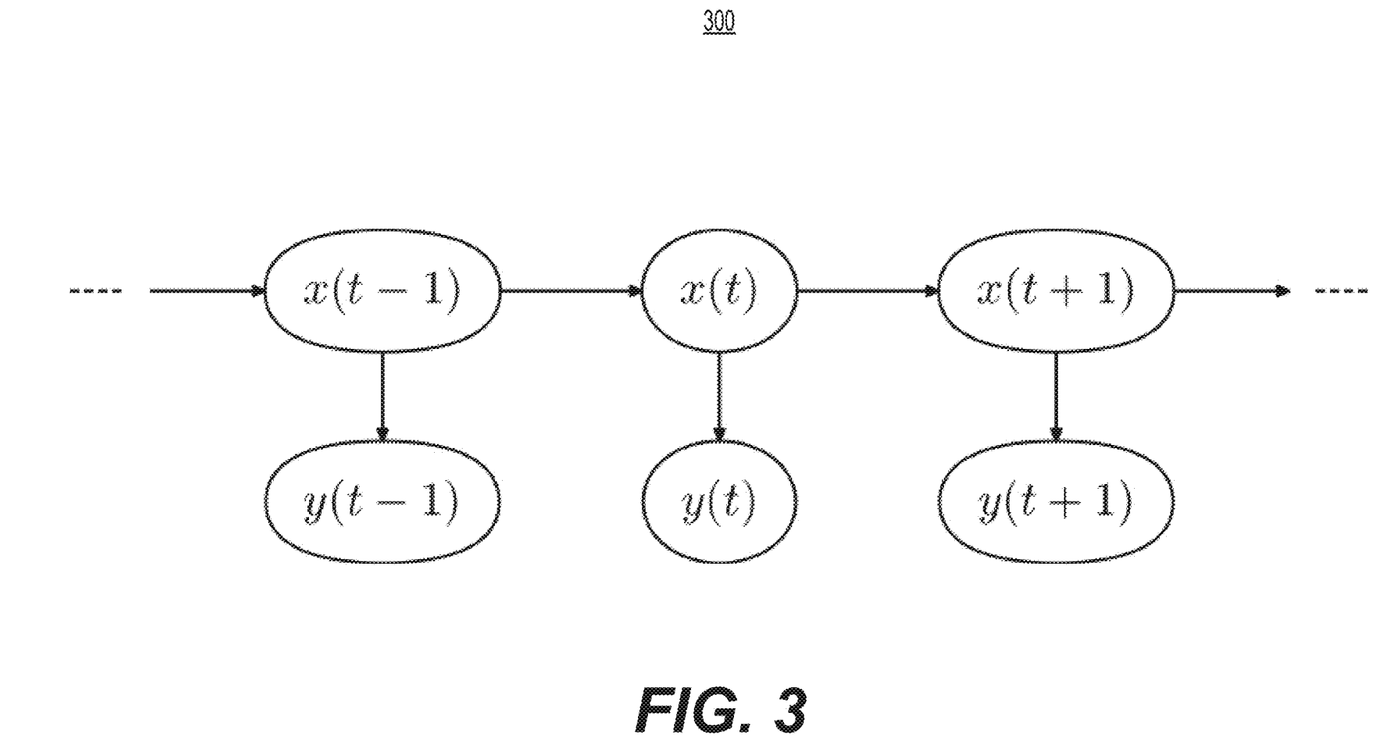
FIG. 3 is a diagram of an example hidden Markov model, according to an example embodiment of the present disclosure.

FIG. 3 depicts a diagram of an example hidden Markov model 300. In model 300, each variable y is an observation variable assumed to be random. In addition, each variable x is a hidden variable and is also assumed to be random. Accordingly, the value of x at time t depends only on x at time t−1, the value of x at time t+1 depends only on x at time t, and the like for all x. This is the Markov property built into model 300. Moreover, the value of y at time t depends only the value of x at time t, and the like for all y.

Model 300 may be used for speech recognition. In particular, the hidden Markov model may use one or more representations of portions of a speech signal (e.g., coefficients of a Fourier transform thereof, one or more vectors representative of a portion thereof, or the like) as the observational states y. The model may then derive phones, words, sentences, or the like as the hidden states x. The correct hidden states x may be based on estimated transition probabilities between the hidden states that result in an optimal match to a corresponding observational state (or states) y. The transitional probabilities may be predetermined or may be trained using, e.g., training data, feedback from a trainer, or the like.

Figure 4:
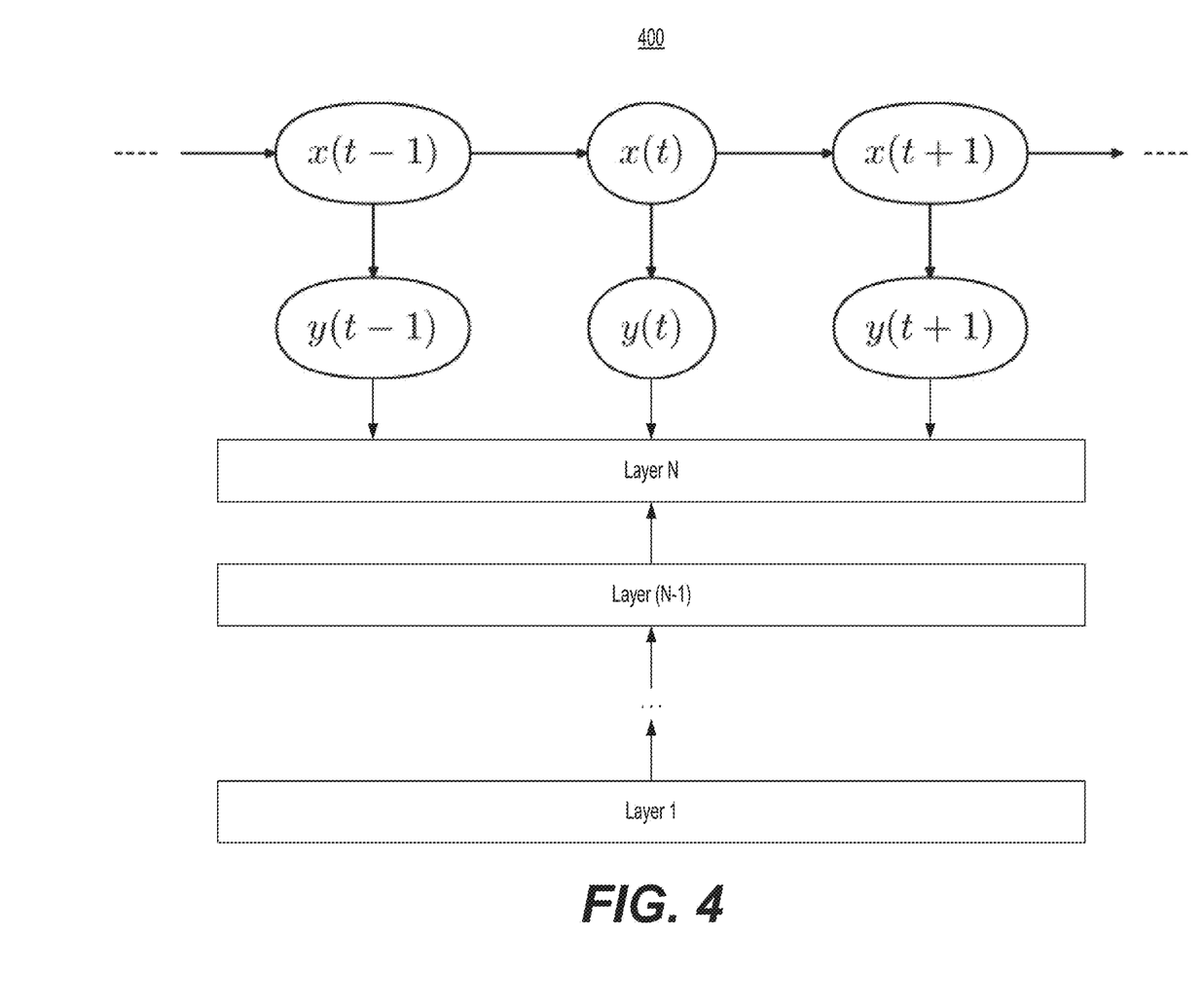
FIG. 4 is a diagram of an example hybrid hidden Markov model with a neural network, according to an example embodiment of the present disclosure.

FIG. 4 depicts an example hybrid model 400 combining a hidden Markov model with a neural network. Model 400 includes hidden Markov model 300 but incorporates a neural network having N layers. For example, the neural network may be used to determined transition probabilities to use in the hidden Markov model, thereby increasing the accuracy of the hidden Markov model. The neural network may be trained similarly to hidden Markov model 300 but allows for more dynamic training because the plurality of nodes in the neural network may be used to output a more dynamic range of probabilities than a static set of trained probabilities.

Figure 5:
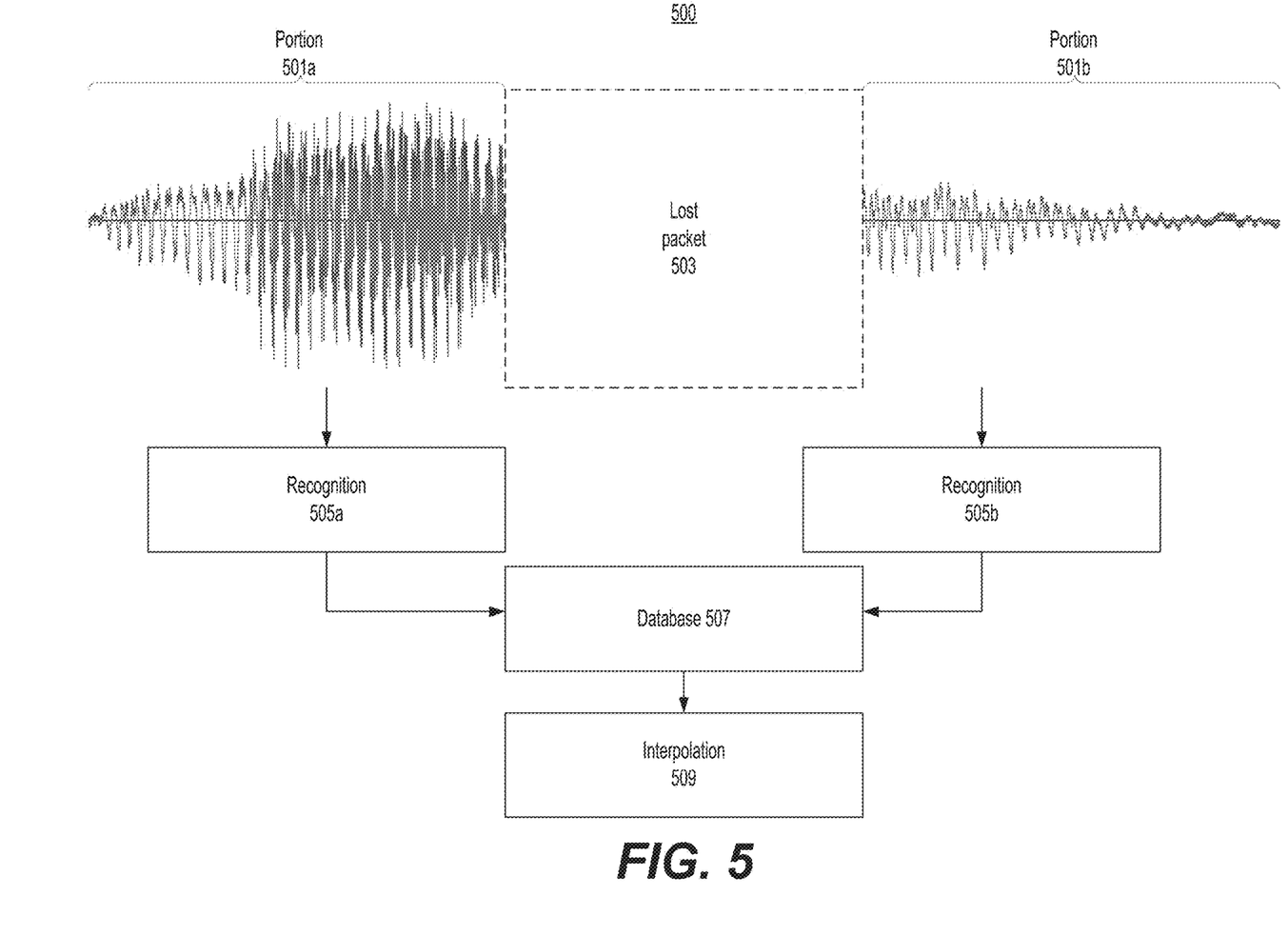
FIG. 5 is a diagram of speech signal processing on a signal to transcribe speech using a database, according to an example embodiment of the present disclosure.

FIG. 5 is a diagram of an example process 500 for speech signal processing on a signal to transcribe speech using a database. In process 500, a speech signal comprises a portion 501a and a portion 501b that surround a gap 503, e.g., caused by a packet that was lost during transmission of the speech signal. Although depicted as having a single gap, the speech signal may comprise more than two portions and more than one gap. Moreover, although depicted as a pure (e.g., all zeroes) gap, gap 503 may include some data that is distorted or otherwise unusable, e.g., caused by encoding errors, mismatched packets, or the like.

As further depicted in FIG. 5, portions 501a and 501b are transformed into recognitions 505a and 505b. Recognitions 505a and 505b may comprise text transcriptions of portions 501a and 501b and may be determined, for example, using a hidden Markov model. Recognitions 505a and 505b may then be applied to a lookup database 507 to extrapolate likely contents for gap 503. Using the database 507, a waveform (or a portion of a waveform) may be selected as interpolation 509 to fill gap 503. Although not depicted in FIG. 5, interpolation 509 may be adjusted (e.g., smoothed or otherwise modified) to fit portions 501a and 501b (or at least parts of portions 501a and 501b that are near the boundaries between portions 501a and 501b and gap 503).

Figure 6:
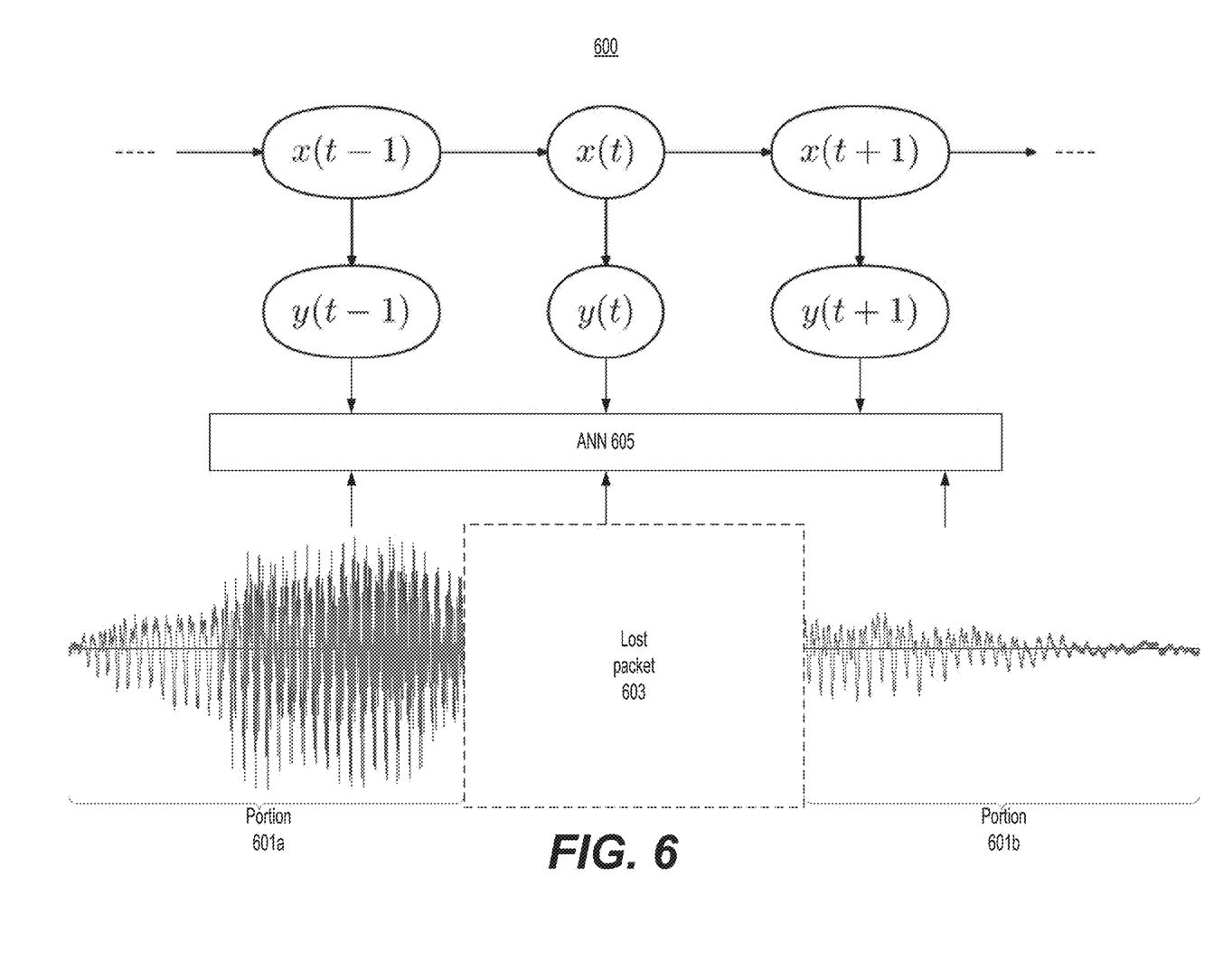
FIG. 6 is a diagram of speech signal processing on a signal to transcribe speech using a neural network, according to an example embodiment of the present disclosure.

FIG. 6 is a diagram of an example process 600 speech signal processing on a signal to transcribe speech using a neural network. Similar to process 500, process 600 accepts, as input, a speech signal that comprises a portion 601a and a portion 601b that surround a gap 603, e.g., caused by a packet that was lost during transmission of the speech signal. Although depicted as having a single gap, the speech signal may comprise more than two portions and more than one gap. Moreover, although depicted as a pure (e.g., all zeroes) gap, gap 603 may include some data that is distorted or otherwise unusable, e.g., caused by encoding errors, mismatched packets, or the like.

As further depicted in FIG. 6, portions 601a and 601b are fed into artificial neural network (ANN) 605 along with gap 603. Accordingly, ANN 605 may determine transition probabilities for all of the waveform including gap 603. These transition probabilities may then be fed into a hidden Markov model, as depicted in FIG. 6. Thus, a set of possible waveforms to fill gap 603 may be obtained from running the hidden Markov model one or more times based on the outputs of the neural network and then using the neural network to reconstruct the waveforms based on the outputs of the hidden Markov model.

Although depicted without a lookup database 507 like in FIG. 5, process 600 may be modified to include a database. For example, the outputs of the hidden Markov model may be used to lookup corresponding waveforms from the lookup database rather than reconstructing them directly from the neural network. In such embodiments, the neural network may still be used to determine the associated probabilities for the corresponding waveforms rather than being indexed in the database and/or being determined, e.g., based on a similarity score between ends of the corresponding waveforms and portions of the input waveform that bound the gap.

Figure 7:
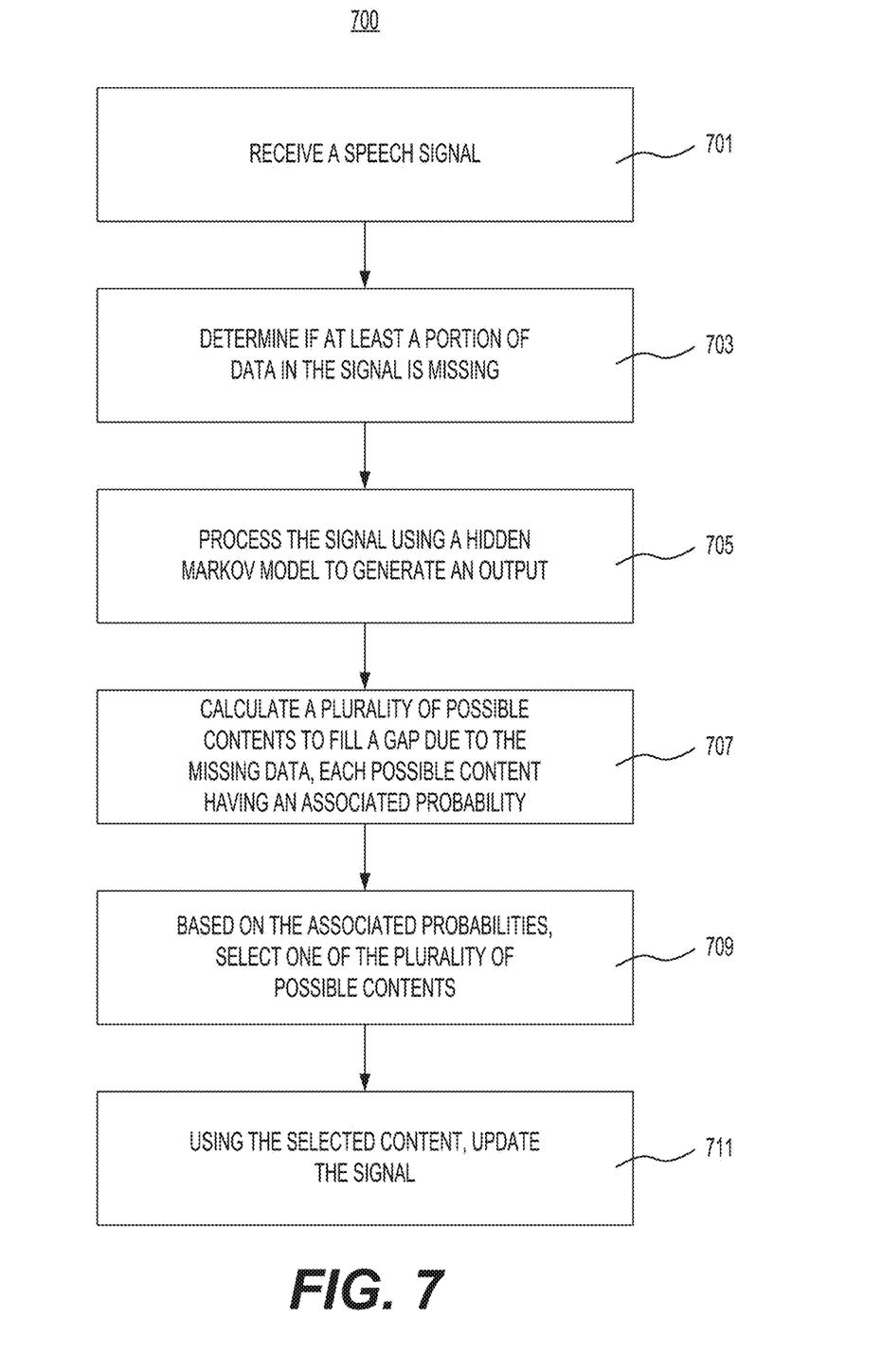
FIG. 7 is a flowchart of speech signal processing on a signal to transcribe speech, according to an example embodiment of the present disclosure.

FIG. 7 is a flowchart of example method 700 for speech signal processing on a signal to transcribe speech. Method 700 may be implemented using a general-purpose computer including at least one processor, e.g., communications server 801 of FIG. 8. Alternatively, a special-purpose computer may be built for implementing method 700 using suitable logic elements. Although described as using a communications server, part or all of method 700 may be executed by a device associated with the recipient (e.g., a laptop computer, a desktop computer, a smartphone, a tablet, or the like).

At step 701, a processor may receive a speech signal. The signal may comprise a waveform (or a digital representation thereof). For example, the signal may comprise an audio signal encoded in one or more formats (e.g., Waveform Audio Format (WAV), Advanced Audio Coding (AAC), MPEG-2 Audio Layer III (MP3), or the like). In certain aspects, the signal may comprise a speech signal (i.e., may include speech in the audio).

The signal may be received over one or more computer networks, as explained above. For example, the signal may have been capturing at one or more user interface devices using one or more microphones and/or other audio recording devices that encode audio into a digital audio signal and then encoded at the one or more user interface devices prior to transmission over the one or more networks. Additionally, the one or more user interface devices (or other device transmitting the signal) may divide the signal into one or more packets in accordance with standards for the one or more networks (e.g., TCP/IP, UDP, Token Ring, or the like).

At step 703, the processor may determine if at least a portion of data in the (received) signal is missing. For example, at least a portion may be missing due to packet loss during transmission. Other losses may occur, for example, during encoding of the signal (e.g., at the one or more user interface devices) and/or decoding of the signal (e.g., at the communications server).

In some embodiments, the processor may determine that at least a portion is missing by detecting a lost packet during packet reassembly. Additionally or alternatively, the processor may determine that at least a portion is missing by detecting a portion of the signal that has null or other filler values (e.g., a series of zeroes or the like). Additionally or alternatively, the processor may determine the portion by recognizing a portion including garbled or otherwise unrecognizable and/or unusable data (e.g., caused by encoding or decoding errors).

At step 705, the processor may process the signal using a hidden Markov model to generate an output. For example, the processor may determine a set of transition probabilities to use for the states that are predetermined or may by dynamically determined based on one or more training sets. The states may be words, phonemes, diphones, triphones, senones, or the like. The output may comprise a transcription of the signal, e.g., text.

At step 707, the processor may, using the output, calculate a set of possible contents to fill a gap due to the missing data portion. For example, the set of contents may comprise a set of possible text contents to fill a gap in the transcription. As explained above, each possible content may have an associated probability.

In some embodiments, the processor may calculate the possible contents using a database indexing waveforms to at least a portion of the output. For example, the database may include waveforms (or portions thereof) indexed by a corresponding transcription of the waveform (or the portion). The database may have been constructed from one or more training sets. For example, the processor may have used one or more training sets to transcribe one or more of the indexed waveforms and/or to estimate the indexed waveforms from a corresponding transcription.

At step 709, based on the associated probabilities, the processor may select one of the set of possible contents. For example, the processor may select the possible content using maximization, Condorcet criteria, a Borda count, or the like.

In embodiments where two or more possible contents have associated probabilities that are equal or close (e.g., within 1%, within 2%, within 5%, or the like), the processor may use one or more tie-breaking techniques. For example, the processor may compare a portion at the beginning and a portion at the end of the possible contents to a portion of the signal before the gap and a portion of the signal after the gap, respectively and perform the selection, at least in part, based on one or more similarity scores for the compared portions.

At step 711, the processor may, using the selected possible content, update the signal. For example, the processor may attach a portion of a waveform associated with the selected content. The processor may then modify the received signal by replacing the gap with the associated waveform (or portion thereof). In some embodiments, the processor may further modify the received signal by smoothing the transition between the received signal and the attached waveform at the beginning of the portion that was previously the gap and the corresponding end.

Method 700 may further include additional steps. For example method 700 may include sending the updated signal to one or more participants in a communications session. For example, a user interface device associated with at least one participant in the communications session may receive the signal from the processor over a computer network. At the user interface device, the signal may be decoded after reception over one or more computer networks and, e.g., converted into sound using one or more speakers and/or other transducers that convert a digital audio signal to corresponding sounds.

In embodiments where the processor uses a database, method 700 may further include updating the database based on the updated signal. For example, after smoothing the waveform (or portion thereof) that was inserted into the signal and/or performing any additional modifications, the processor may determine if the adjustments result in any changes to a corresponding transcription of the selected waveform, and update the database if there are any changes to the corresponding transcription. In some embodiments, updating the database may include reducing a loss function associated with the database. For example, the processor may calculate a first loss function for the un-updated database and a second loss function for the database if the associated waveform is added thereto. The processor may then update the database if the second loss function is reduced compared to the first loss function.

Updating the database may be additionally or alternatively based on feedback received from one or more users. For example, the processor may send a signal to one or more user interfaces devices asking for feedback on whether the updated signal is good or bad. The user may be asked to rate the overall quality of the updated signal, to rate the naturalness of the updated signal, or the like. Additionally or alternatively, the user may be asked whether or not the updated signal was good, noticeable, or the like. Accordingly, the processor may remove entries from the database who receive poor feedback (e.g., a particular number of scores below a threshold, a particular number of feedback comments below a sentiment score, or the like).

Although described above as using a hidden Markov model, the processor may use a hybrid hidden Markov model coupled with one or more neural networks. For example, the one or more neural networks may have been trained using one or more training sets (e.g., similar to the database, as explained above). Additionally or alternatively, the one or more neural networks may have been trained without training data, e.g., by using one or more clustering techniques (such as k-means clustering), one or more techniques for unsupervised learning of neural networks (such as autoencoding), and/or one or more latent variable models (such as an expectation-maximization algorithm, a method of moments, or the like).

In such embodiments, the processor may use probabilities output by the one or more neural networks to calculate the set of possible contents using the hidden Markov model. Accordingly, the processor may use the neural networks in combination with a lookup database, as explained above, or in lieu of the lookup database. In an example using the lookup database, the processor may select the possible contents from the lookup database and use the neural networks to determine the associated probabilities. In an example omitting the lookup database, the processor may run the hidden Markov model directly on the signal having the gap with the transition probabilities determined by the neural networks operating on the signal having the gap such that the set of possible contents is output directly from the hidden Markov model having associated probabilities from the neural networks.

As explained above, FIG. 8 is a block diagram that illustrates an example communications server 801 suitable for implementing the disclosed systems and methods. Communications server 801 may reside on a single server farm or may be distributed across a plurality of server farms.

Figure 8:
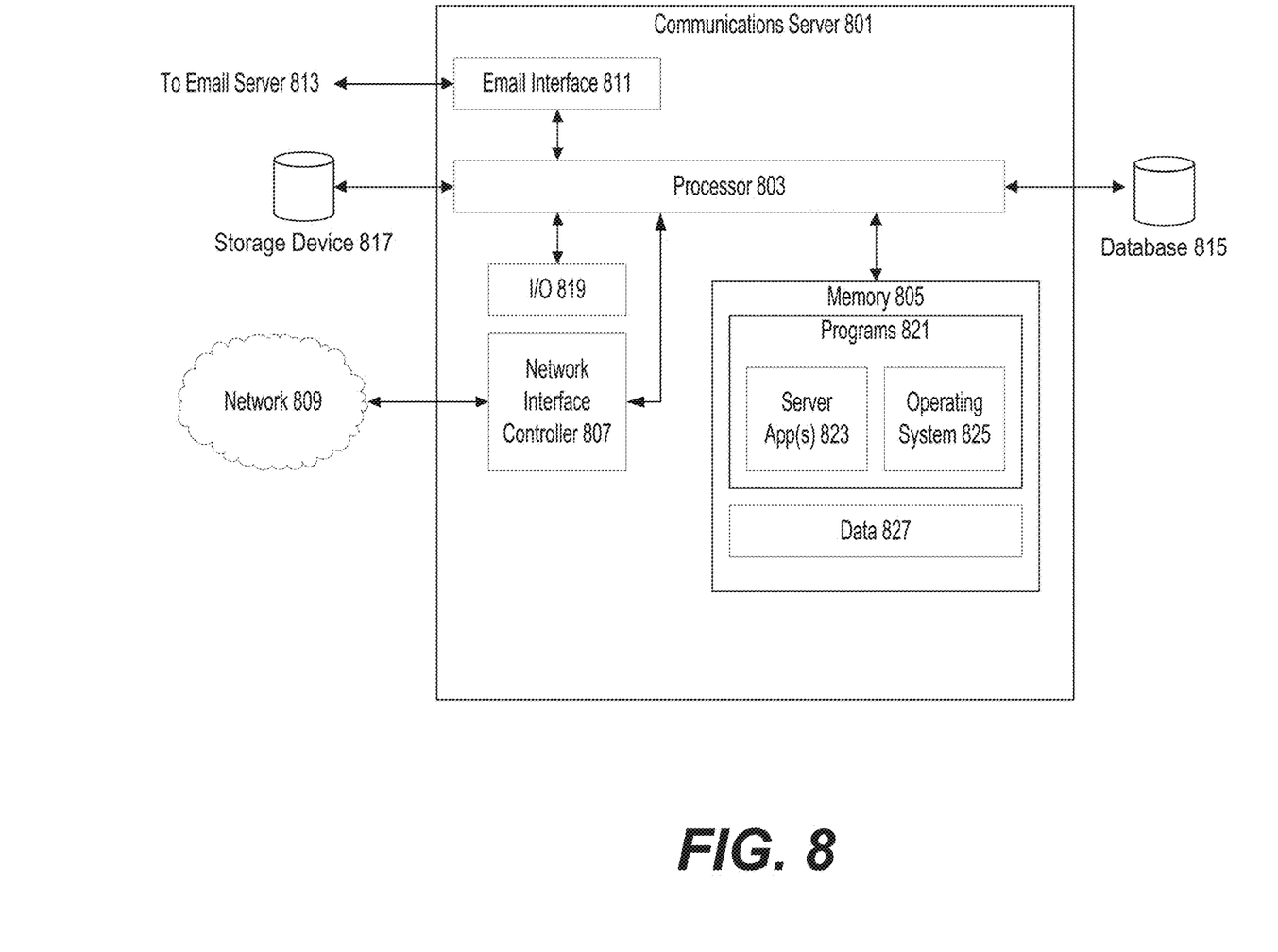
FIG. 8 is a block diagram of an example computing device with which the systems, methods, and apparatuses of the present invention may be implemented.

As depicted in FIG. 8, communications server 801 may include at least one processor (e.g., processor 803), at least one memory (e.g., memory 805), and at least one NIC (e.g., NIC 807).

Processor 803 may comprise a central processing unit (CPU), a graphics processing unit (GPU), or other similar circuitry capable of performing one or more operations on a data stream. Processor 803 may be configured to execute instructions that may, for example, be stored on memory 805.

Memory 805 may be volatile memory (such as RAM or the like) or non-volatile memory (such as flash memory, a hard disk drive, or the like). As explained above, memory 805 may store instructions for execution by processor 803.

NIC 807 may be configured to facilitate communication with communications server 801 over at least one computing network (e.g., network 809). Communication functions may thus be facilitated through one or more NICs, which may be wireless and/or wired and may include an Ethernet port, radio frequency receivers and transmitters, and/or optical (e.g., infrared) receivers and transmitters. The specific design and implementation of the one or more NICs depend on the network 809 over which communications server 801 is intended to operate. For example, in some embodiments, communications server 801 may include one or more wireless and/or wired NICs designed to operate over a GSM network, a GPRS network, an EDGE network, a Wi-Fi or WiMax network, and a Bluetooth® network. Alternatively or concurrently, communications server 801 may include one or more wireless and/or wired NICs designed to operate over a TCP/IP network.

Processor 803, memory 805, and/or NIC 807 may comprise separate components or may be integrated in one or more integrated circuits. The various components in communications server 801 may be coupled by one or more communication buses or signal lines (not shown).

As further depicted in FIG. 8, communications server 801 may include an email interface 811 configured to communicate with email server 813. Although depicted as separate in FIG. 8, email interface 811 may, in whole or in part, be integrated with NIC 807.

As depicted in FIG. 8, communications server 801 may include and/or be operably connected to a database 815 and/or a storage device 817. Database 815 may represent a relational database, object database, document database, or other digital database, which may be stored, in whole or in part, on communications server 801 and/or, in whole or in part, on a separate server (e.g., one or more cloud storage servers). Storage device 817 may be volatile (such as RAM or the like) or non-volatile (such as flash memory, a hard disk drive, or the like).

I/O module 819 may enable communications between processor 803 and memory 805, database 815, and/or storage device 817.

As depicted in FIG. 8, memory 805 may store one or more programs 821. For example, programs 821 may include one or more server applications 823, such as applications that facilitate audio encoding and decoding, facilitate communications sessions using NIC 807, facilitate exchanges with email interface 811, or the like. By way of further example, programs 821 may include an operating system 825, such as DRAWIN, RTXC, LINUX, iOS, UNIX, OS X, WINDOWS, or an embedded operating system such as VXWorkS. Operating system 825 may include instructions for handling basic system services and for performing hardware dependent tasks. In some implementations, operating system 825 may comprise a kernel (e.g., UNIX kernel). Memory 805 may further store data 827, which may be computed results from one or more programs 821, data received from NIC 807, data retrieved from database 815 and/or storage device 817, and/or the like.

Each of the above identified instructions and applications may correspond to a set of instructions for performing one or more functions described above. These instructions need not be implemented as separate software programs, procedures, or modules. Memory 805 may include additional instructions or fewer instructions. Furthermore, various functions of communications server 801 may be implemented in hardware and/or in software, including in one or more signal processing and/or application specific integrated circuits.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for speech signal processing on a signal to transcribe speech, the system comprising:
    a memory storing instructions; and
    a processor configured to execute the instructions to:
        determine that at least a portion of data in the signal is missing,
        process the signal using one or more neural networks to generate a plurality of transition probabilities,
        process the signal using a hidden Markov model applying the plurality of transition probabilities to generate an output,
        using the output, calculate a set of possible contents to fill a gap due to the missing data portion, and
        update the signal using at least one of the set of possible contents.

2. The system of claim 1, wherein calculating the set of possible contents comprises using a database indexing waveforms to at least a portion of the output.

3. The system of claim 2, wherein the database is constructed from one or more training sets.

4. The system of claim 3, wherein the processor is further configured to update the database based on the updated signal.

5. The system of claim 4, wherein the update to the database is further based on feedback received from one or more users.

6. The system of claim 4, wherein updating the database comprises reducing a loss function associated with the database.

7. The system of claim 1, wherein the signal is further processed using one or more neural networks.

8. The system of claim 7, wherein calculating the set of possible contents comprises using the output of the hidden Markov model as the set of possible contents and obtaining associated probabilities for the set of possible contents using the one or more neural networks.

9. The system of claim 1, wherein the processor is further configured to send the updated signal to one or more participants in a communications session.

10. The system of claim 9, wherein the communications session comprises at least one of a video conference and an audio conference.

11. A computer-implemented method for speech signal processing on a signal to transcribe speech, the method comprising:
    determining that at least a portion of data in the signal is missing;
    processing the signal using one or more neural networks to generate a plurality of transition probabilities;
    processing the signal using a hidden Markov model applying the plurality of transition probabilities to generate an output;
    using the output, calculating a set of possible contents to fill a gap due to the missing data portion; and
    updating the signal using at least one of the set of possible contents.

12. The method of claim 11, wherein calculating the set of possible contents comprises using a database of indexing waveforms to at least a portion of the output.

13. The method of claim 12, further comprising updating the database based on the updated signal.

14. The method of claim 13, wherein updating the database comprises reducing a loss function associated with the database.

15. The method of claim 11, wherein the signal is further processed using one or more neural networks.

16. The method of claim 15, wherein calculating the set of possible contents comprises using probabilities output by the one or more neural networks to calculate the set of possible contents using the hidden Markov model.

17. The method of claim 11, further comprising sending the updated signal to one or more participants in at least one of a video conference or an audio conference.

18. A non-transitory computer-readable medium storing instructions that, when executed by at least one processor, cause the at least one processor to:
    determine that at least a portion of data in the signal is missing;
    process the signal using one or more neural networks to generate a plurality of transition probabilities;
    process the signal using a hidden Markov model applying the plurality of transition probabilities to generate an output;
    using the output, calculate a set of possible contents to fill a gap due to the missing data portion; and
    update the signal using at least one of the set of possible contents.

19. The non-transitory medium of claim 18, wherein calculating the set of possible contents comprises using a database of indexing waveforms to at least a portion of the output.

20. The non-transitory medium of claim 18, wherein calculating the set of possible contents comprises using the output of the hidden Markov model as the set of possible contents and obtaining associated probabilities for the set of possible contents using the one or more neural networks.

* * * * *